(12) United States Patent
Malakar (10) Patent No.: US 11,463,538 B2
(45) Date of Patent: *Oct. 4, 2022

(54) ADAPTING PLAYBACK SETTINGS BASED ON CHANGE HISTORY

(71) Applicant: Brightcove Inc., Boston, MA (US)

(72) Inventor: Arup Malakar, San Francisco, CA (US)

(73) Assignee: Brightcove Inc., Boston, MA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/202,215

(22) Filed: Mar. 15, 2021

(65) Prior Publication Data

US 2021/0203746 A1 Jul. 1, 2021

Related U.S. Application Data

(63) Continuation of application No. 15/431,673, filed on Feb. 13, 2017, now Pat. No. 10,951,729.

(51) Int. Cl.
| | | |
|---|---|---|
| *H04L 67/30* | (2022.01) | |
| *H04L 69/24* | (2022.01) | |
| *G06F 16/335* | (2019.01) | |
| *H04N 21/258* | (2011.01) | |
| *H04L 67/08* | (2022.01) | |
| *H04L 65/75* | (2022.01) | |

(52) U.S. Cl.
CPC ............ *H04L 67/30* (2013.01); *G06F 16/337* (2019.01); *H04L 65/764* (2022.05); *H04L 67/08* (2013.01); *H04L 69/24* (2013.01); *H04N 21/25841* (2013.01)

(58) Field of Classification Search
CPC ......... G06F 3/165; G06F 3/167; H04L 65/60; H04L 67/306
See application file for complete search history.

(56) References Cited

U.S. PATENT DOCUMENTS

2014/0248036 A1* 9/2014 Saari ................... G11B 27/3027
386/248
2015/0073574 A1* 3/2015 Brenner ............... H04N 21/654
700/94

\* cited by examiner

*Primary Examiner* — Hitesh Patel
(74) *Attorney, Agent, or Firm* — Thomas Franklin (57) ABSTRACT

Techniques discussed herein improve a user's playback experience of a multimedia file by automatically adjusting playback settings based on change history data stored in one or more profiles. A system is configured to detect and collect information regarding changes to playback settings made by one or more users, and/or made in response to input from one or more users, during presentation of a media title, such as a song and/or movie, on one or more computers. This information is processed by a backend process on one or more server computers to determine predicted preferred playback settings for a particular user using a particular computer or playback device, requesting a particular multimedia file.

20 Claims, 7 Drawing Sheets

SYSTEM ARCHITECTURE OF ADAPTIVE PLAYBACK SYSTEM 100

ADAPTING PLAYBACK SETTINGS BASED ON CHANGE HISTORY

CROSS-REFERENCE TO RELATED APPLICATIONS

This application is a continuation of U.S. patent application Ser. No. 15/431,673, filed Feb. 13, 2017, the entire disclosure of which is hereby incorporated by reference, for all purposes, as if fully set forth herein.

FIELD OF THE INVENTION

The present invention relates to automatically modifying playback settings of multimedia files and, more specifically, to improved computer-implemented techniques for adapting playback settings based on change history.

BACKGROUND

Typically, multimedia files are edited in post-production using a standard set of output devices. For example, the sound components of a multimedia file may be optimized using "monitor" headphones that do not add any filters or effects to the sound profile of the file. Similarly, the video aspects of the multimedia file may be quality tested on a 60 inch LCD video monitor with calibrated colors for red, blue, and green.

Unfortunately, these multimedia files are often viewed on a wide-array of devices that output sound and video differently. Subtle sound effects that are clear on monitor headphones may be completely lost when output through speakers of a mobile device using an application with built in equalizers and filters. Additionally, video optimized for a 60 inch max brightness LCD screen may lack contrast when output through a 5.5 inch screen of a phablet using an application with power saving features implemented for that device.

During playback, when the audio or video is non-optimal, users may try to fine-tune the playback using controls provided by the playback application. While these changes may improve the playback experience for one video, the changes may actually worsen the experience for other videos. Consequently, users who desire optimal visual and audio experience during each video they watch may find themselves having to fiddle with setting controls before every video playback experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques discussed herein improve a user's playback experience of a multimedia file by automatically adjusting playback settings based on change history. As used herein, "Multimedia files", "playable media", and "streamable media" may include, among other things, audio and/or visual media.

According to the techniques described herein, a system is configured to detect and collect information regarding changes to playback settings made by one or more users, and/or made in response to input from one or more users, during presentation of a media title, such as a song and/or movie, on one or more computers. Information may also be collected about the user(s) and client devices used to playback the media. This information is collectively referred to herein as "change history data". In one embodiment, the change history data is processed by a backend process on one or more server computers to determine predicted preferred playback settings for a particular user using a particular computer or playback device, playing a particular media title.

For example, user information and configuration information for a plurality of users may be recorded while playing a particular media title. The information may be sent to a remote computer to generate one or more machine learning models. Based on the one or more machine learning models, a subsequent request may be analyzed in conjunction with one or more profiles that are associated with a predicted preferred playback configuration for a particular media title. While a client computer operated by the user presents the particular media title, the playback configurations may be automatically adjusted throughout the presentation based on the predicted preferred playback configurations.

System Overview

Figure 1:
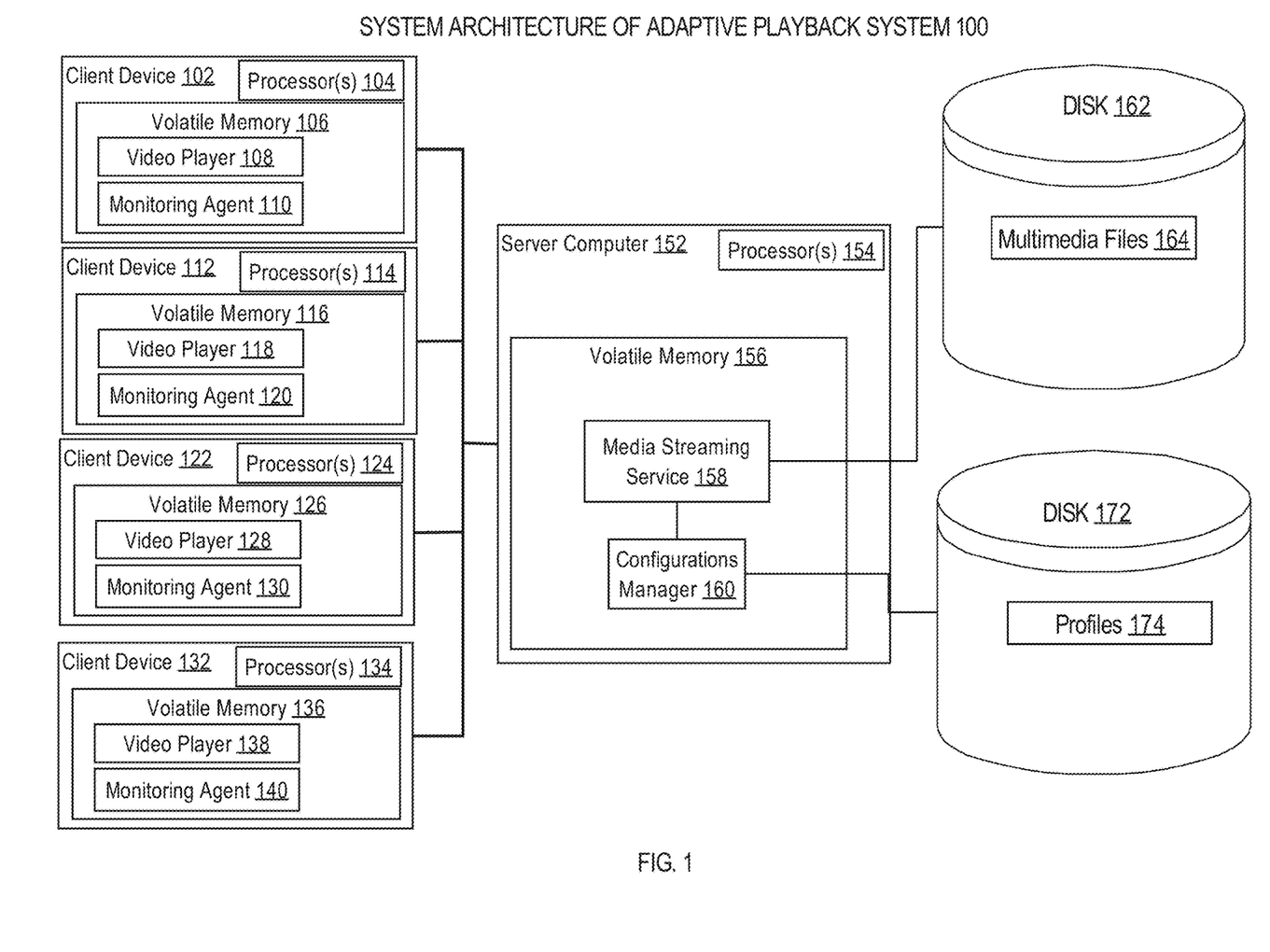
FIG. 1 is a block diagram illustrating an example of a system architecture of a media streaming service configured to automatically adjust playback settings of requested multimedia files.

FIG. 1 is a block diagram illustrating an example of a system architecture of a media streaming service configured to automatically adjust playback settings of requested multimedia files. The system architecture 100 comprising four client devices 102, 112, 122, 132 coupled to a server computer 142, which is coupled to persistent storages 162, 172. Each of the client devices 102, 112, 122, 132 comprises one or more processors 104, 114, 124, 134 and volatile memory 106, 116, 126, 136 executing an instance of a video player 108, 118, 128, 138 and a monitoring agent 110, 120, 130, 140. The server computer 152 comprises on or more processors 154 and volatile memory 156 executing an instance of a media streaming service 158 and a configurations manager 160.

In alternative embodiments, the system architecture 100 may comprise one or more server computers each executing one or more instances of the media streaming service and the configurations manager, and coupled to one or more shared persistent storage devices (e.g., hard disks, flash memories). For example, while in the illustrated embodiment server computer 152 is executing a single instance of media streaming service 158 and configurations manager 160, in alternative embodiments, the system can be scaled up vertically to execute three instances of the media streaming service and the configurations manager or scaled up horizontally to include three server computers each including its own media streaming service and configurations manager, wherein each server computer is operatively coupled to the same shared disk(s).

A "client device" may be one or more physical computers, virtual computers, and/or computing devices. As an example, a client device may be one or more desktop computers, laptop computers, mobile devices, smartphones, tablets, phablets, PDAs, iPods®, eReader, digital video recorders or streamers, and/or any other special-purpose computing devices. Any reference to "client device" herein may mean one or more computers, unless expressly stated otherwise.

Media streaming service instance 158 responds to requests for multimedia files that are submitted to server computer 152 by one or more client devices 102, 112, 122, 132 using an instance of the video player application 108, 118, 128, 138, respectively. Media streaming service 158 takes each request, parses the request, and searches disk 162 for the particular multimedia file requested. The particular multimedia file may then be loaded into volatile memory 156 and streamed to the requesting client device. A media streaming service may contain one or more threads to respond to requests, so multiple requests can be handled asynchronously or in-parallel.

The configurations manager hooks into the media streaming service, reads each request, and provides additional metadata to respond with. In some embodiments, the configurations manager may be referred to as a stack layer. In these embodiments, requests are routed through the configurations manager to transparently provide playback settings management metadata to the client devices.

Disks 162, 172 include data and metadata of multimedia files. Disk 162 contains multimedia files 164 themselves as well as indexes and statistics on those multimedia files. Disk 172 contains profiles of playback settings change history data. Each profile may be stored in association with a respective multimedia file. In some cases, both multimedia files 164 and profiles 174 may be stored entirely on a single disk.

Video Player

Video players 108, 118, 128, 138 may execute as an independent application or as applet in another application such as web browser. The user interface of a video player contains one or more controls including physical controls, touch screen controls, camera controls, microphone controls, or other input devices to control the playback of a multimedia file. Specific controls may include playing or pausing a video, jumping to specific locations in the video or jumping ahead or behind incremental amounts of time, zooming in and out.

Video players 108, 118, 128, 138 may also contain one or more controls allowing a user to control whether to allow the player to automatically adjust playback settings based on metadata received from server 152.

Adjustable Playback Settings

Adjustable playback settings may include, among other things, volume, contrast, brightness, color, gamma, color balance, resolution, size of the media player, and/or controlling additional screen, video and sound settings.

Some players may contain additional configurable settings such as whether the background behind the video player is darkened or whether sounds outside of the video player are dampened or muted. These additional outside configurations may be tracked as playback setting changes as well.

Changes to any of the above configurations, and/or any other playback settings may be recorded and sent to remote server computer 152 and/or directly to persistent storage 172. A change in a configuration may cause an event of a particular type to trigger. For example, if a client computer adjusts the volume in response to user input, then a VolumeChange event may be triggered. An event may include metadata. For example, a VolumeChange event may include metadata such as a new volume level, an old volume level, and/or a difference in volume level. The event metadata may also include the time during playback at which the change was applied, and a unique timestamp of the event by concatenating a monitoring agent's unique id with the absolute time of the event, and an event id associated with the type of event.

If no playback settings are changed during the course of playback of a multimedia file, an event may be triggered at the end of the duration of the playback indicating that no event occurred. This "no event" metadata may also be provided back to server computer 152.

Monitoring Agent

Monitoring agents 110, 120, 130, 140 comprise one or more threads that generate metadata regarding attributes of the video playing on the video player 108, 118, 128, 138; the client device 102, 112, 122, 132; or context that is accessible through the client device whenever a playback setting is adjusted. Metadata may also include information about the user based on the user account playing the multimedia file. A monitoring agent may hook into a video player in order to generate metadata in response to an event triggered by the video player. Alternatively, the monitoring agent may be fully integrated into a video player, and the monitoring agent generates metadata based directly on user actions that change playback settings.

The attribute metadata may be streamed instantaneously to the configurations manager or collected and sent in discrete sized packets. Additionally, the client device may be "offline" if it is not communicatively coupled to one or more server computers configured to receive user and/or configuration information. If a device is offline, the attribute metadata may be store in persistent storage of the client device until the device is once again online. A client device may be "online" if it is communicatively coupled to one or more server computers configured to receive user and/or configuration information.

A. Device Attributes

In some embodiments, one or more monitoring agents collect device attributes in association with a change to playback settings event. Device attributes include but are not limited to:

Whether the changed playback setting was automatically adjusted;

Operating system name/version;

Device brand, model, and/or type (e.g., mobile/desktop/tablet/set top/game console, etc.);

Time of day

Geolocation;

Type of network (home/public/office);

Browser name/version; and

The player name/version etc.

These attributes are stored as metadata in client devices 102, 112, 122, 132. The client device attributes may be detected and collected by monitoring agents 110, 120, 130, 140, but stored as associated with change history data by the configurations manager 160 in profiles 174.

A machine learning algorithm or a determinative categorization algorithm may be used to group similar client devices together based on one or more client-device attributes.

B. Media File Attributes

Media file attributes are properties of media files that may be used to relate similar content of multimedia files. For example, media file attributes may include properties, such as file type (e.g., video/audio or more specifically, MP3, MP4, .avi, etc.), title, genre, duration, actors, keywords, tags, etc. These attributes may be stored as metadata in persistent storage 162, but stored as associated with change history data by the configurations manager 160 in profiles 174.

A content-based filtering algorithm may be used to identify profiles that are similar to a particular multimedia file's profile. The greater the similarity between the particular multimedia file and the compared multimedia files, the more likely playback setting change events that occurred during the compared multimedia files would also be preferred during the particular multimedia file. The content-based filtering algorithm may be a machine learning algorithm trained with a training set of similar and different multimedia files.

C. User Attributes

User attributes are any inputs that relate to user opinions or behavior. User attributes take advantage of the assumption that two people that have similar opinions about one thing are likely to have similar opinions about another thing. In the context of predicting playback setting changes during playback of multimedia files, user attributes assume that if a target user has performed similar changes to playback settings as another user, then the target user is likely to make the same changes to playback settings that the other user made.

Information about the opinions of users may be obtained or derived in a variety of ways. For example, the types of changes a user has made is implicitly reflected in the user's profile history. Thus, user attributes may include metadata about the video viewing history of the target user, the viewing history of users that are similar to the target user, and/or the viewing history of an entire population of viewers.

User attributes may also include demographic information, based on the assumption that users with similar demographic characteristics will have similar playback settings changes. Such demographic information may include, for example, the age, gender, and geographic location of users. The user attributes may also include interests that users have explicitly identified by, for example, filling out a video preference survey or rating previously-viewed videos.

Playback Settings Manager

The configurations manager 160 processes newly received change history data to derive improved predicted playback configuration(s) for a better playback experience. The server computer(s) may process the newly received information as the information is received, and may store the playback configuration(s) in profiles 174 associated with individual multimedia files, user accounts, or client devices. Additionally or alternatively, configurations manager 160 may process newly received information periodically and/or at regular intervals, such as every 15, 30, 60 minutes, and/or once every day, etc. Additionally or alternatively, configurations manager 160 may process raw change history data in a multimedia profile when a request for a particular multimedia file is received.

The configurations manager may employ one or more conditional expressions, statistical models, or machine learning techniques and/or models to predict playback setting changes to automatically apply for future requests of a multimedia file.

Example Detection Case

Figure 3:
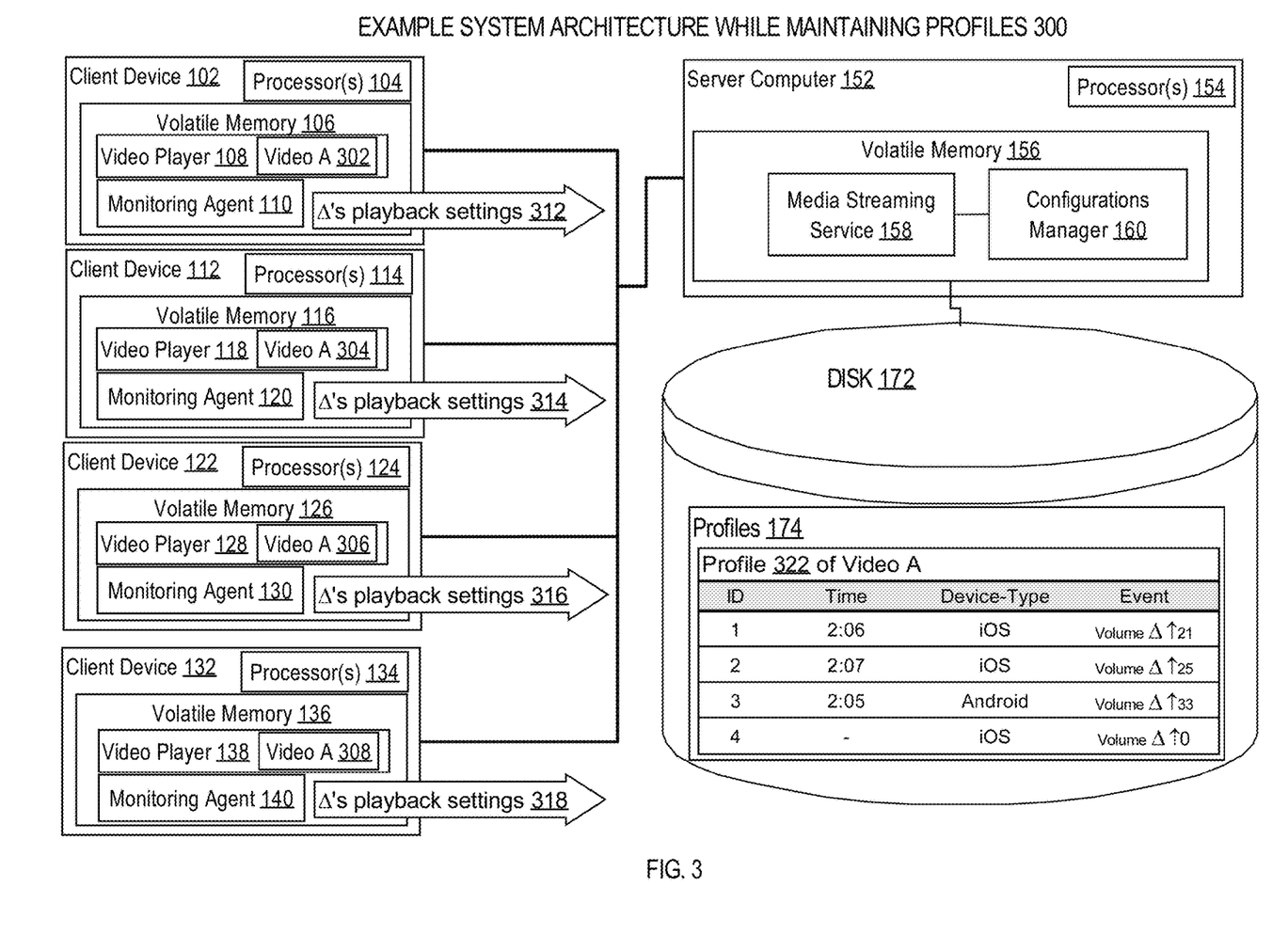
FIG. 3 is an example system architecture of the adaptive playback settings system while maintaining profiles.

FIG. 3 is an example system architecture of the adaptive playback settings system while maintaining profiles. The example system architecture delineates occurrences 302, 304, 306, 308 of Video A being played on each respective instance 108, 118, 128, 138 of a video player running on a respective client device 102, 112, 122, 132. As each occurrence 302, 304, 306, 308 of Video A is played, a respective monitoring agent 110, 120, 130, 140 detects changes to playback settings as an event generated by the respective video player 108, 118, 128, 138, and collects attributes from the respective client device 102, 112, 122, 132 regarding the client device, the client device context, the user account playing Video A on that instance, Video A itself, or any combination thereof. As indicated by the arrows 312, 314, 316, 318, the changes are sent to remote configurations manager 160, which logs the changes in one or more profiles including profile 322 as change history data.

The configurations manager 160 logs the change history data with an ID or timestamp and proceeds to store the data in one or more corresponding profiles of profiles 174. The change history data of profile 322 shows four records of change history data that were logged based on events triggered from four client devices 102, 112, 122, 132. The records contain the time of the change during playback of the video, the device type of the client device that received the change, and the actual event that occurred. In this particular example, an increase in volume was detected around the same time (~2:06) during playback of Video A on client devices 102, 112, 122. No increase in volume was detected in client device 132. In this particular example, device-type is categorized based on operating system of the client device. Three client devices run the iOS® operating system, and one client device runs an Android® operating system.

Determinitative Analysis Overview

Figure 2A:
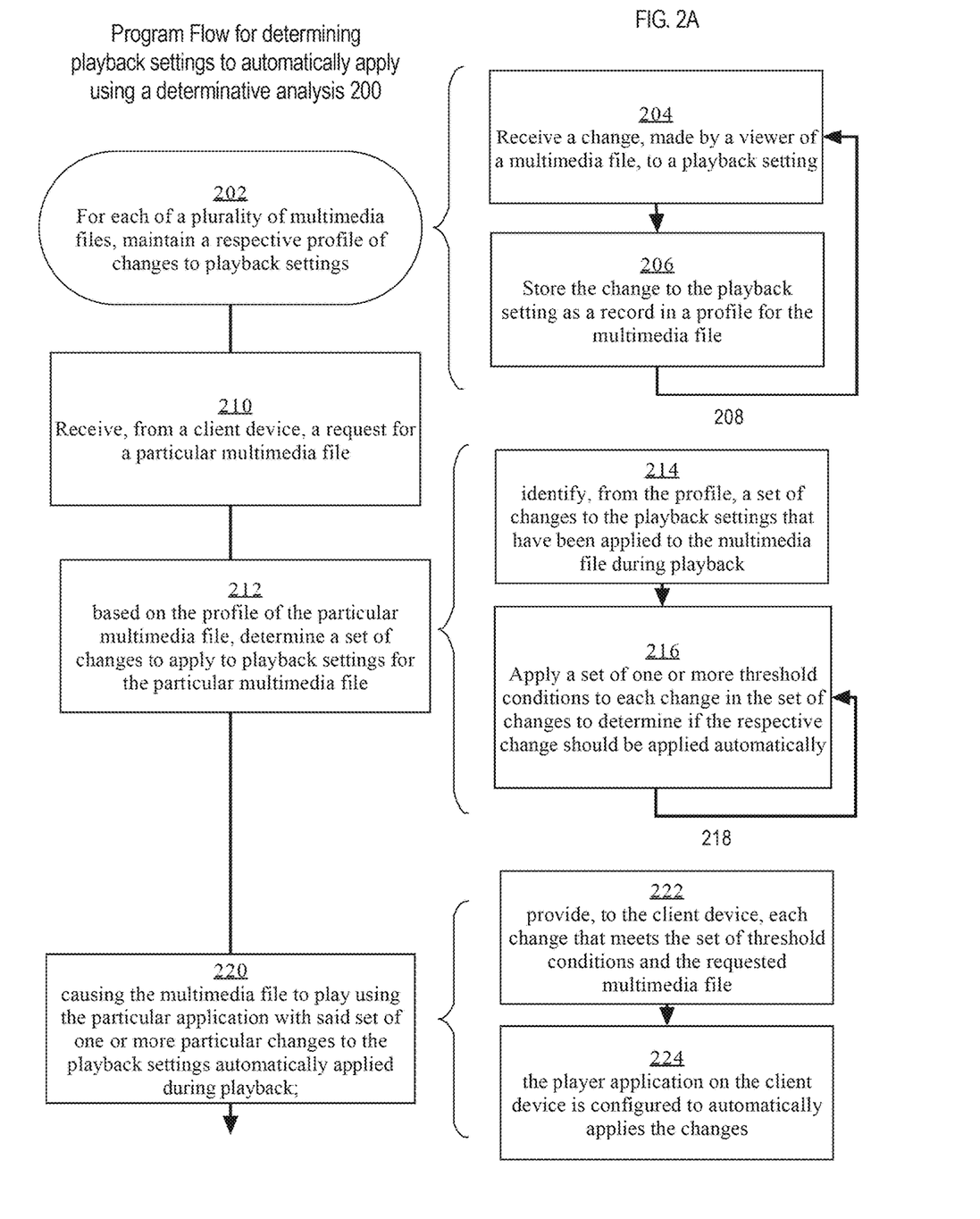
FIG. 2A is a flow diagram illustrating a program flow for determining playback settings to automatically apply using a determinative analysis.

FIG. 2A is a flow diagram illustrating a program flow for determining playback settings to automatically apply using a determinative analysis. At step 202, a configurations manager, which is executing on a server computer, maintains a respective profile of changes to playback settings for each of a plurality of multimedia files. As seen at step 204, maintaining these profiles may include receiving change history data that is based on the changes to the playback settings that were detected to have occurred during playback of the respective multimedia file. As seen at step 206, maintaining these profiles may further include storing the change history data as a record in a profile for the multimedia file. Arrow 208 indicates that steps 204 may need to execute multiple times. Each time more change history data is received and stored in a profile.

At step 210, the configurations manager receives from a particular client device, a request for a particular multimedia file. Based on the profile of the particular multimedia file, the configurations manager determines the changes to apply to playback settings for playback of the particular multimedia file at step 212. As seen at step 214, determining the changes to apply may include the manager identifying, from the change history data of the profile, the changes that had been previously applied to the multimedia file during playback. Identifying may involve grouping records in the profile by when they were applied during playback and further grouping them by which device type was used when they were applied. Then a set of conditions are applied to those groups of records to determine whether each change should be applied automatically during playback at step 216. A simple condition could be if a change is logged in more than 500 records that are grouped by device type, then that change will be applied automatically during playback. Arrow 218 indicates that multiple changes to playback settings may be identified at step 214, so the threshold conditions are applied to each change of the multiple changes to determine which changes should be applied automatically.

At step 220, the manager responds to the request by causing the multimedia file to play, using a particular application on the client device, with the one or more changes to the playback settings determined at step 212. As seen at step 222, causing the changes to be applied may include providing, to the client device, each change that meets the threshold conditions in addition to providing the multimedia file itself. The instance of the video player application on the client device is configured to automatically apply these changes during playback of the particular multimedia file as seen at step 224.

Determinative Analysis Example

Figure 4A:
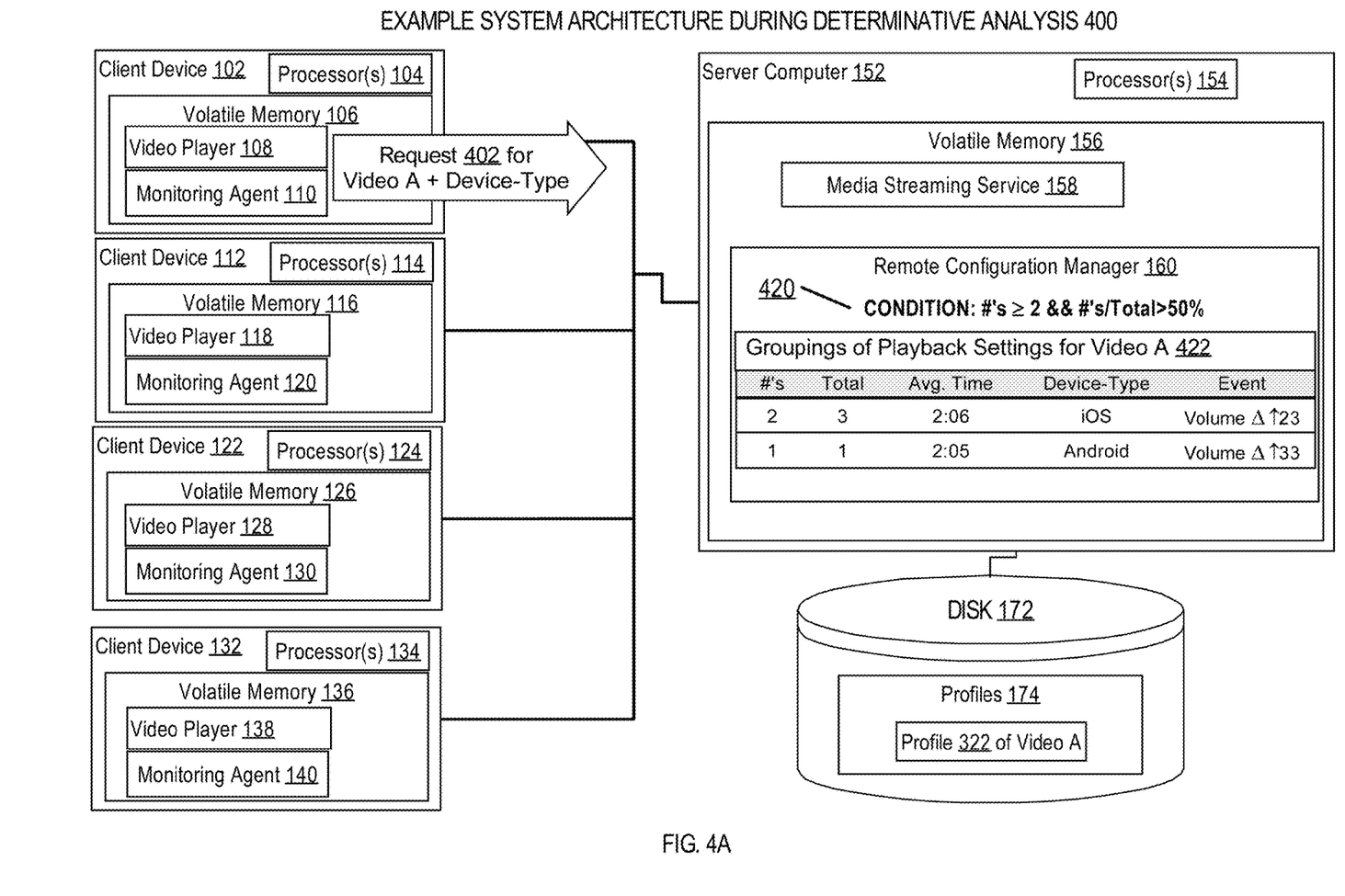
FIG. 4A is an example system architecture of the adaptive playback settings system while performing a determinative analysis.

FIG. 4A is an example system architecture of the adaptive playback settings system while performing a determinative analysis. Client device 102 sends a request 402 for video A to server computer 152. Remote configurations manager 160 reads the four records in profile 322 and groups them by playback settings changed at a particular time during playback and by specific device-type. The particular time and action can be grouped based on statistical significance such as times recorded within a standard deviation of one another. Thus, the volume changes 21, 25 can all be grouped in an average volume category of 23 and, the times are grouped by an average time 2:06.5. The specific device-type can be grouped based on any number of factors such as iOS type and version or model of device.

Once the devices are grouped, the configurations manager applies a set of one or more conditions to the aggregate number (#) of changes to playback settings grouped in each category. In the example 400, the condition is that the aggregate number of changes must be greater than or equal to two AND the population to enact said change must be greater than 50%. Based on these conditions, a change in volume will automatically be applied to client devices requesting Video A that are running an iOS operating system (i.e., aggregate number of devices(2)>=2 AND aggregate percentage (2/3~66%)>50%), but the changes will not be applied to a device running an android operating system (i.e. aggregate number of devices(1) IS NOT>=2).

Assume client device 102 is running an iOS operating system. The request for video A is responded to with Video A and playback settings including increasing the volume by 23.3 at 2:06 during playback. Video player 108 plays Video A with these changes to playback settings automatically applied at the appropriate time (2:06).

Machine Learning Analysis Overview

Figure 2B:
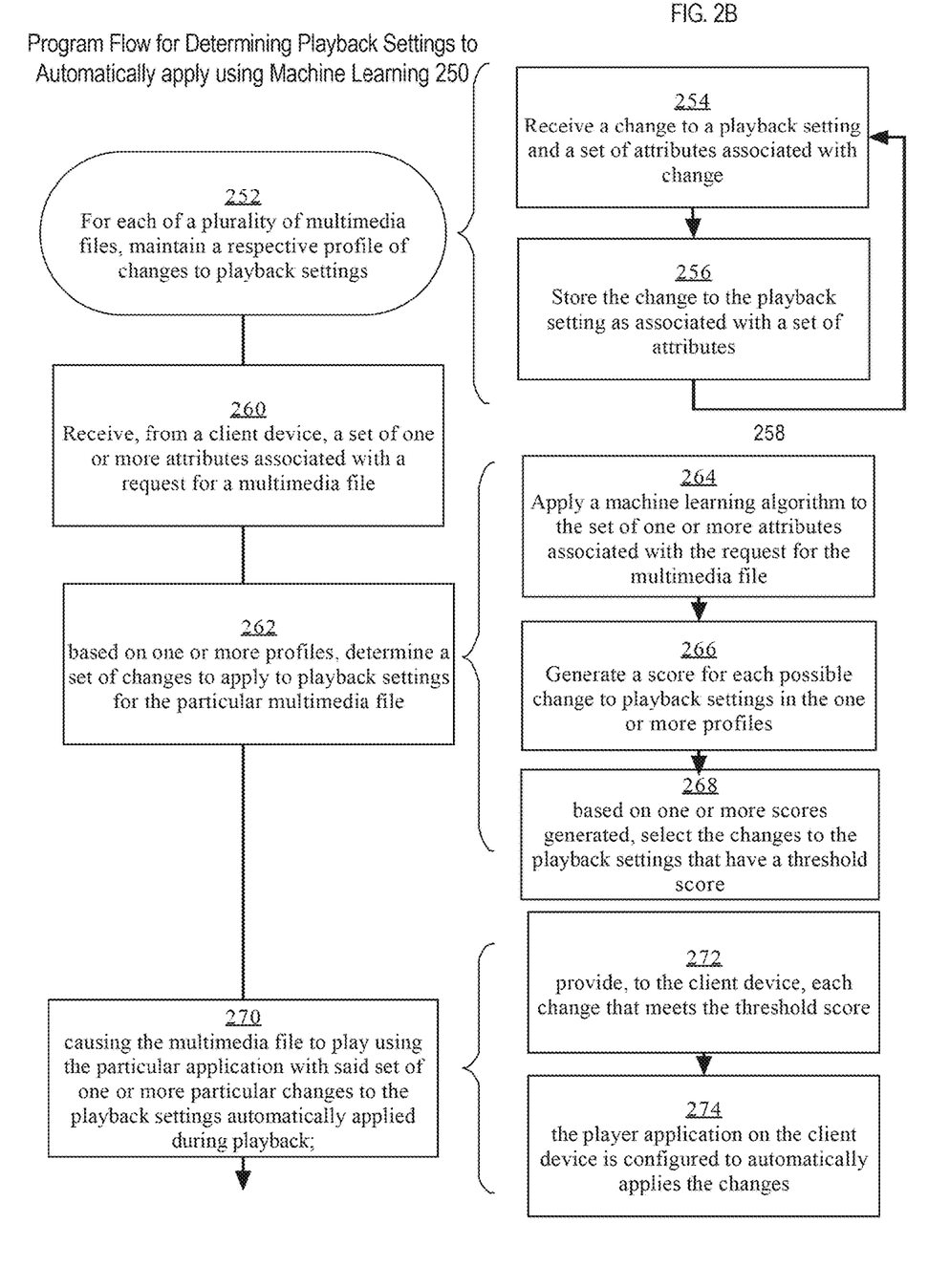
FIG. 2B is a flow diagram illustrating a program flow for determining playback settings to automatically apply using machine learning.

FIG. 2B is a flow diagram illustrating a program flow for determining playback settings to automatically apply using machine learning. At step 252, a configurations manager, which is executing on a server computer, maintains multiple profiles of changes to playback settings for each of a plurality of multimedia files. As seen at step 254, maintaining these profiles may include receiving change history data that is based on the changes to the playback settings that were detected to have occurred during playback of the respective multimedia file. As seen at step 256, maintaining these profiles may further include storing the change history data as a record in a profile for the multimedia file. Arrow 258 indicates that steps 204 may need to execute multiple times. Each time change history data is received, more change history data is stored in one or more corresponding profiles.

At step 260, the configurations manager receives from a particular client device, a request for a particular multimedia file. Based on one or more profiles associated with the particular multimedia file, the manager determines the changes to apply to playback settings for playback of the particular multimedia file at step 262. As seen at step 264, determining the changes to apply may include the manager determining a set of associated profiles. These profiles may be associated based on similar attributes to the attributes of the user account, client device, or multimedia file of the request. For example, the request for the particular multimedia file may have attributes such as "Genre:Action", "time_of_day:6:00 pm", and "geolocation: San Francisco." Profiles with change history data of events that occurred to media files of the same genre, during the same time of day, or in a similar geographic region may be identified as associated with the request. The remote configurations manager then applies a machine learning algorithm to a set of one or more attributes associated with the request for the particular multimedia file using the attributes and actions in the change history data of the one or more profiles. The machine learning algorithm compares the attributes associated with the request to similar attributes that are recorded in the change history data of the one or more profiles. At step 266, the configurations manager then generates one or more scores for one or more possible changes to playback settings. Some changes to playback settings that are in the profile of the particular multimedia file may naturally be weighted more heavily using the machine learning algorithm. The machine learning algorithm may be trained to weigh similarities between these attributes more heavily.

In some embodiments, scores may only be given to possible changes that are at least derived from a set of changes recorded in the change history data of the profile of the particular multimedia file that was requested. Alternatively, the scores may be given to possible changes recorded in the change history data of all of the one or more profiles that were selected based on similar requests.

The configurations manager uses the machine learning algorithm to generate a score for every possible change, and then at step 268, the configurations manager selects the changes to automatically apply to the requested multimedia file based on the scores. For example, the configurations manager may apply a threshold score condition of (0.7) or higher in order to select changes to automatically apply.

At step 220, the manager responds to the request by causing the multimedia file to play, using a particular application on the client device, with the selected one or more changes to the playback settings determined at step 262. As seen at step 272, causing the changes to be applied may include providing, to the client device, each change that meets the threshold score in addition to providing the multimedia file itself. The instance of the video player application on the client device is configured to automatically apply these changes during playback of the particular multimedia file as seen at step 274.

Machine Learning Analysis Example

Figure 4B:
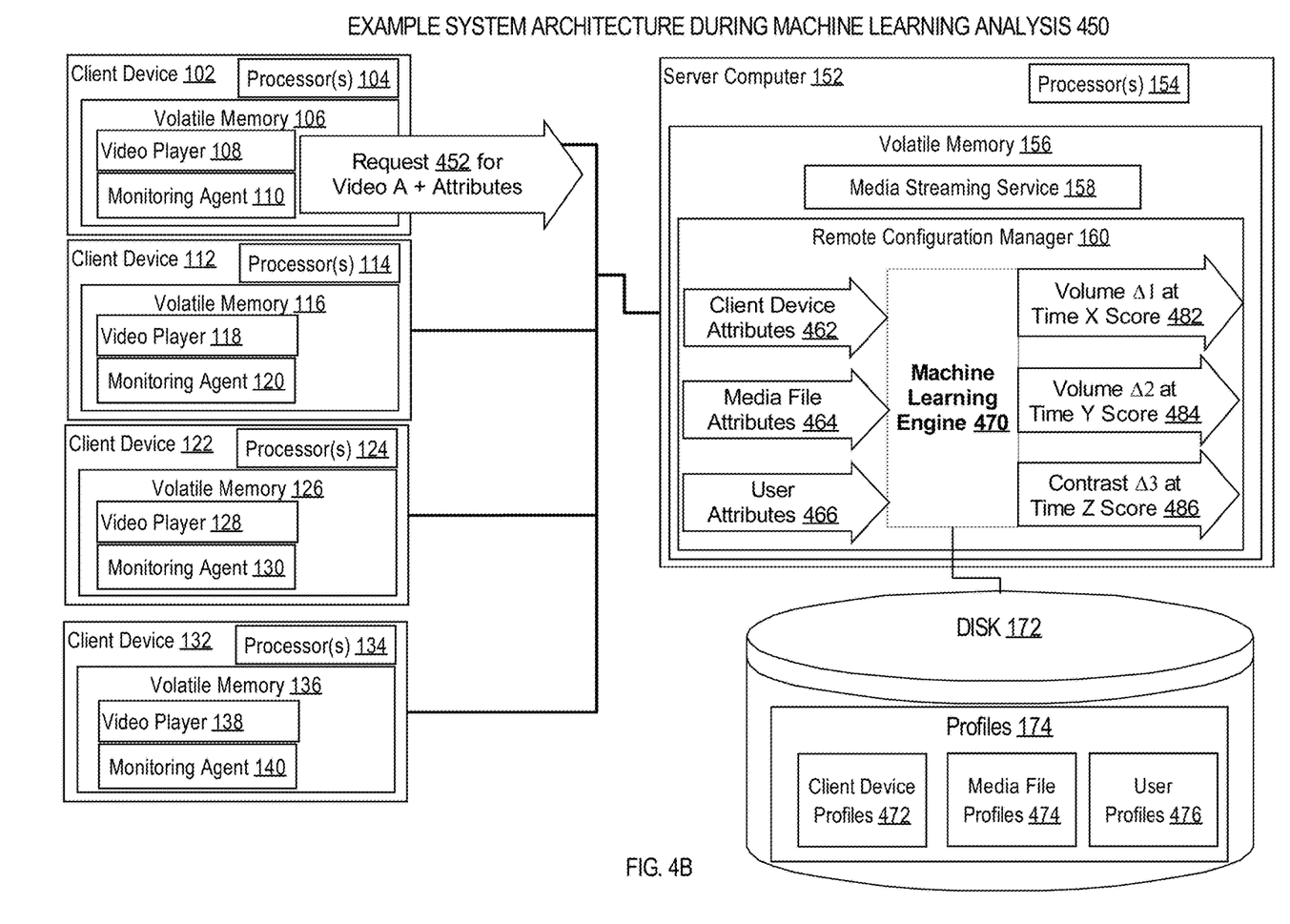
FIG. 4B is an example system architecture of the adaptive playback settings system while performing a machine learning analysis.

FIG. 4B is an example system architecture of the adaptive playback settings system while performing a machine learning analysis. Client device 102 sends a request 452 for Video A with attributes to server computer 152. Remote configurations manager 160 reads request 452 and parses out client device attributes 462, requested movie attributes 464, and the user account attributes 466. The configurations manager 160 selects a group of one more profiles with similar attributes to attributes 462, 464, 464. The configurations manager 160 then uses machine learning engine 470 to apply the change history data from these profiles to the client device attributes 462, requested media file attributes 464, and user attributes 466 to generate scores for each of a plurality of possible changes to automatically apply to playback settings. The possible changes are derived from one or more related profiles in profiles 472, 474, 476 based on the attributes of the particular multimedia file (i.e., Video A) requested by the particular user account (not shown) using the particular client device 106. In this example, the possible changes include:

Volume change 1 at time X,
Volume change 2 at time Y, and
Contrast change 3 at time Z The machine learning engine 470 generates, for each of the possible changes listed above, a respective score 482, 484, 486.

Once the scores are generated, the configurations manager 160 applies a threshold score condition to each of the generated scores 482, 484, 486 and then causes the video player 108 to automatically apply changes to playback settings based on scores that meet the threshold score condition.

Assume the threshold score condition is 0.7 and the volume change 1 score 482 meets this condition. The request for Video A is responded to with Video A and playback settings including changing the volume to volume change 1 at time X during playback. Video player 108 plays Video A with these changes to playback settings automatically applied at the appropriate time.

Assume the contrast change 3 score 486 also meets the threshold score condition. This may be for reasons unrelated to the media file profiles 474. For example, the particular geolocation may be located in a rural area and the time of day of the client device is at night—both attributes stored in the change history data of client device profiles 472. Requests from client devices with these types of attributes will automatically cause changes to all multimedia files played on these devices if the machine learning engine is given enough information to decrease the weight of the attributes in the media file profiles 474.

Client Device Feedback

Machine learning engine 470 can "learn" from further changes to playback settings recorded after automatically applying changes to playback settings. Thus, if monitoring agent 110 detects additional playback settings changes after some playback changes were automatically applied, the profile of Video A, the user profile of the particular user account playing the multimedia file, and the profile for the client device may be changed accordingly.

Changes made to playback settings that are directly related to a particular profile that matches the attributes sent in the request (i.e., same user profile, same media file, or same client device profile) may be weighted more heavily by the machine learning engine. Weighting the attributes of a particular profile may be done manually by making a separate category of attributes that are weighted heavier or by having multiple copies of the particular profiles that match input into the machine learning engine.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
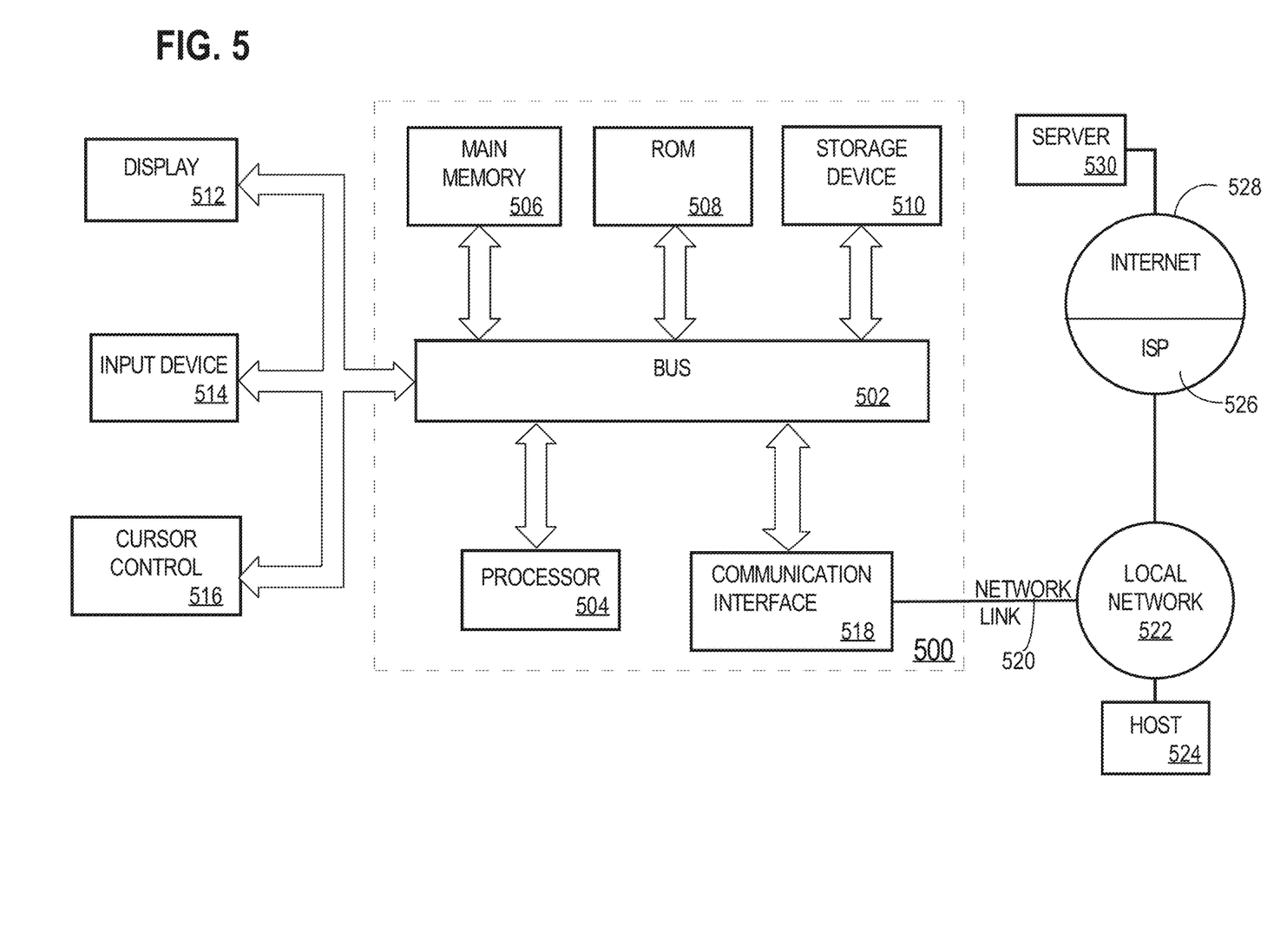
FIG. 5 is a block diagram illustrating a computer system that may be used to implement the techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  during playback of each of a plurality of multimedia files, detecting changes to playback settings;
  for each respective multimedia file of the plurality of multimedia files, maintaining a respective profile that includes change history data that is based on the changes to the playback settings that were detected to have occurred during playback of the respective multimedia file;
  receiving, from a particular client device, a request for a particular multimedia file of the plurality of multimedia files, wherein the request includes a set of one or more attributes associated with the request;
  based on change history data from one or more profiles of the plurality of multimedia files, determining one or more changes to apply to playback settings for playback of the particular multimedia file, wherein:
    the one or more changes to apply to playback settings include applying machine learning algorithm to the set of one or more attributes associated with the request for the particular multimedia file, and
    the one or more changes are generated based on the machine learning algorithm; and
  responding to the request by causing the multimedia file to play, using a particular application on said particular client device, with said one or more changes to the playback settings automatically applied during playback;

wherein the method is performed by one or more computing devices.

2. The method of claim 1, wherein the one or more profiles includes at least a particular profile of changes, by viewers, to playback settings of the particular multimedia file; wherein determining the one or more changes to the playback settings based on the one or more profiles of the plurality of multimedia files, includes:
grouping the changes of the particular profile by:
a time at which each change occurred while playing the particular multimedia file, and
a client device type of a plurality of client device types on which each change to the playback settings occurred;
wherein determining the one or more changes to the playback settings includes applying a set of one or more threshold conditions to the groupings.

3. The method of claim 2, wherein the one or more changes to playback settings includes a change to volume while playing a particular multimedia file at a particular time on a particular client device type that is the client device type of the particular client device.

4. The method of claim 1, further comprising:
for each client computer of a plurality of client computers, receiving attributes associated with each change to the playback settings;
wherein determining the one or more changes to the playback settings based on the one or more profiles of the plurality of multimedia files, includes:
generating, for the particular multimedia file, a respective score for each possible change to playback settings described in the one or more profiles; and
based on one or more scores generated, selecting the one or more changes to the playback settings.

5. The method of claim 4, wherein the one or more profiles includes at least a particular profile of changes, by viewers, to playback settings of the particular multimedia file; wherein the method further comprises: increasing a weight of attributes associated with changes, by viewers, to playback settings of the particular multimedia file.

6. The method of claim 4, wherein the attributes include time of day and geolocation.

7. The method of claim 6, wherein the one or more changes to playback settings includes a change to contrast during a particular time of day at a particular geolocation.

8. One or more non-transitory computer-readable media storing one or more sequences of instructions which, when executed by one or more processors, cause performance of:
during playback of each of a plurality of multimedia files, detecting changes to playback settings;
for each respective multimedia file of the plurality of multimedia files, maintaining a respective profile that includes change history data that is based on the changes to the playback settings that were detected to have occurred during playback of the respective multimedia file;
receiving, from a particular client device, a request for a particular multimedia file of the plurality of multimedia files, wherein the request includes a set of one or more attributes associated with the request;
based on change history data from one or more profiles of the plurality of multimedia files, determining one or more changes to apply to playback settings for playback of the particular multimedia file, wherein:
the one or more changes to apply to playback settings include applying machine learning algorithm to the set of one or more attributes associated with the request for the particular multimedia file, and
the one or more changes are generated based on the machine learning algorithm; and
responding to the request by causing the multimedia file to play, using a particular application on said particular client device, with said one or more changes to the playback settings automatically applied during playback.

9. The one or more non-transitory computer-readable media of claim 8, wherein the one or more profiles includes at least a particular profile of changes, by viewers, to playback settings of the particular multimedia file; wherein determining the one or more changes to the playback settings based on the one or more profiles of the plurality of multimedia files, includes:
grouping the changes of the particular profile by:
a time at which each change occurred while playing the particular multimedia file, and
a client device type of a plurality of client device types on which each change to the playback settings occurred;
wherein determining the one or more changes to the playback settings includes applying a set of one or more threshold conditions to the groupings.

10. The one or more non-transitory computer-readable media of claim 9, wherein the one or more changes to playback settings includes a change to volume while playing a particular multimedia file at a particular time on a particular client device type that is the client device type of the particular client device.

11. The one or more non-transitory computer-readable media of claim 8, wherein the one or more non-transitory computer-readable media store instructions which, when executed by one or more processors, further cause:
for each client computer of a plurality of client computers, receiving attributes associated with each change to the playback settings;
wherein determining the one or more changes to the playback settings based on the one or more profiles of the plurality of multimedia files, includes:
generating, for the particular multimedia file, a respective score for each possible change to playback settings described in the one or more profiles; and
based on one or more scores generated, selecting the one or more changes to the playback settings.

12. The one or more non-transitory computer-readable media of claim 11, wherein the one or more profiles includes at least a particular profile of changes, by viewers, to playback settings of the particular multimedia file; wherein the one or more non-transitory computer-readable media store instructions which, when executed by the one or more processors, further cause: increasing a weight of attributes associated with changes, by viewers, to playback settings of the particular multimedia file.

13. The one or more non-transitory computer-readable media of claim 11, wherein the attributes include time of day and geolocation.

14. The one or more non-transitory computer-readable media of claim 13, wherein the one or more changes to playback settings includes a change to contrast during a particular time of day at a particular geolocation.

15. An adaptive playback management system comprising one or more computing devices configured to:

during playback of each of a plurality of multimedia files, detect, by a monitoring agent, changes to playback settings;

for each respective multimedia file of the plurality of multimedia files, maintain, by a configuration manager, a respective profile that includes change history data that is based on the changes to the playback settings that were detected to have occurred during playback of the respective multimedia file;

receive, from a particular client device, a request for a particular multimedia file of the plurality of multimedia files, wherein the request includes a set of one or more attributes associated with the request;

based on change history data from one or more profiles of the plurality of multimedia files, determine one or more changes to apply to playback settings for playback of the particular multimedia file, wherein:

the one or more changes to apply to playback settings include applying machine learning algorithm to the set of one or more attributes associated with the request for the particular multimedia file, and the one or more changes are generated based on the machine learning algorithm; and respond to the request by causing the multimedia file to play, using a particular application on said particular client device, with said one or more changes to the playback settings automatically applied during playback.

16. The adaptive playback management system of claim 15, wherein the one or more profiles includes at least a particular profile of changes, by viewers, to playback settings of the particular multimedia file; wherein in order to determine the one or more changes to the playback settings based on the one or more profiles of the plurality of multimedia files, the one or more computing devices are further configured to:

grouping the changes of the particular profile by:
a time at which each change occurred while playing the particular multimedia file, and
a client device type of a plurality of client device types on which each change to the playback settings occurred;

wherein determining the one or more changes to the playback settings includes applying a set of one or more threshold conditions to the groupings.

17. The adaptive playback management system of claim 16, wherein the one or more changes to playback settings includes a change to volume while playing a particular multimedia file at a particular time on a particular client device type that is the client device type of the particular client device.

18. The adaptive playback management system of claim 15, wherein the one or more computing devices are further configured to:

for each client computer of a plurality of client computers, receive attributes associated with each change to the playback settings;

wherein the configuration to determine the one or more changes to the playback settings based on the one or more profiles of the plurality of multimedia files, includes:

generate, for the particular multimedia file, a respective score for each possible change to playback settings described in the one or more profiles; and based on one or more scores generated, selecting the one or more changes to the playback settings.

19. The adaptive playback management system of claim 18, wherein the one or more profiles includes at least a particular profile of changes, by viewers, to playback settings of the particular multimedia file; wherein the one or more computing devices are further configured to: increase a weight of attributes associated with changes, by viewers, to playback settings of the particular multimedia file.

20. The adaptive playback management system of claim 18, wherein the attributes include time of day and geolocation.

* * * * *